(12) United States Patent
Sun et al.

(10) Patent No.: US 10,620,764 B2
(45) Date of Patent: Apr. 14, 2020

(54) COLOR FILTER SUBSTRATE, FABRICATION METHOD THEREOF AND DISPLAY PANEL

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Dongling Sun, Beijing (CN); Xiaobin Yin, Beijing (CN); Zhengwei Zhu, Beijing (CN); Wencheng Hu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/012,948

(22) Filed: Jun. 20, 2018

(65) Prior Publication Data

US 2019/0121464 A1    Apr. 25, 2019

(30) Foreign Application Priority Data

Oct. 23, 2017    (CN) .......................... 2017 1 0992256

(51) Int. Cl.
| | |
|---|---|
| G06F 3/044 | (2006.01) |
| G02F 1/1362 | (2006.01) |
| G02F 1/1333 | (2006.01) |
| G02F 1/1345 | (2006.01) |

(Continued)

(52) U.S. Cl.
CPC ............ G06F 3/044 (2013.01); G02F 1/1345 (2013.01); G02F 1/13338 (2013.01); G02F 1/133516 (2013.01); G02F 1/136204 (2013.01); G06F 3/0443 (2019.05); *G02F 2202/22* (2013.01); *G02F 2203/62* (2013.01); *G06F 3/0412* (2013.01); *G06F 3/04164* (2019.05);

(Continued)

(58) Field of Classification Search
CPC .......... G02F 1/13338; G02F 1/133516; G02F 1/1345; G02F 1/136204; G02F 2202/22; G02F 2203/62; G06F 2203/04103; G06F 2203/04107; G06F 3/0412; G06F 3/04164; G06F 3/044; G06F 3/0443
See application file for complete search history.

(56) References Cited

U.S. PATENT DOCUMENTS

2010/0258891 A1* 10/2010 Jow .................... G06K 9/00006
                                                                257/433
2011/0037721 A1*  2/2011 Cranfill ................. G06F 3/0414
                                                                345/174

(Continued)

*Primary Examiner* — Afroza Chowdhury
(74) *Attorney, Agent, or Firm* — Calfee, Halter & Griswold LLP (57) ABSTRACT

The present disclosure relates to a color filter substrate, a fabrication method thereof, and a display panel. The color filter substrate includes: a substrate including a first surface and a second surface opposite to each other; a color filter film disposed on the first surface of the substrate; and a force sensitive film disposed on the second surface of the substrate. Further, the force sensitive film is configured to act as a conductor when no pressure is applied and as a non-conductor when under pressure.

15 Claims, 4 Drawing Sheets

(51) Int. Cl.
*G02F 1/1335* (2006.01)
*G06F 3/041* (2006.01)

(52) U.S. Cl.
CPC .............. *G06F 2203/04103* (2013.01); *G06F 2203/04107* (2013.01)

(56) References Cited

U.S. PATENT DOCUMENTS

| | | | |
|---|---|---|---|
| 2013/0265256 A1* | 10/2013 | Nathan | G06F 3/0414 345/173 |
| 2015/0070305 A1* | 3/2015 | Seo | G06F 3/0412 345/174 |
| 2015/0070604 A1* | 3/2015 | Chen | G06F 3/044 349/12 |
| 2017/0269437 A1* | 9/2017 | Chen | G06F 3/044 |

\* cited by examiner

COLOR FILTER SUBSTRATE, FABRICATION METHOD THEREOF AND DISPLAY PANEL

RELATED APPLICATION(S)

The present application claims the benefit of Chinese Patent Application No. 201710992256.9, filed on Oct. 23, 2017, the entire disclosure of which is incorporated herein by reference.

TECHNICAL FIELD

The present disclosure relates to the field of display technology, and specifically provides a color filter substrate, a fabrication method thereof and a display panel.

BACKGROUND

The basic structure of a thin film transistor liquid crystal display (TFT LCD) includes an array substrate and a color filter substrate. In production, a liquid crystal cell is formed by aligning the array substrate with the color filter substrate, and then assembled with an external circuit and a backlight source in a module factory, forming a display panel.

The touch and display driver integration (TDDI) product is an extension of conventional display products. Specifically, in such products, a sensor unit is disposed on an array substrate, and a common voltage signal and a sensor signal are input during different time periods by an integrated circuit (IC), so as to realize a touch function. However, as a conductive layer, an indium tin oxide (ITO) layer on the back surface of the color filter substrate can shield the sensor inside the display panel, so that the touch sensitivity is reduced, and the touch function can't be realized. Therefore, in order to effectively realize the touch function and improve the touch sensitivity, usually, no ITO conductive layer is provided on the back surface of the color filter substrate.

However, since no ITO conductive layer is provided on the back surface of the color filter substrate, the surface of the color filter substrate will lack charge transfer channels. This leads to the accumulation of static electricity on the surface of the color filter substrate, resulting in a significant decrease in electrical conductivity and antistatic capability for the surface of the display panel. For example, for a TDDI type of touch display panel, it is extremely vulnerable to such an accumulation of static electricity.

SUMMARY

According to an aspect of the present disclosure, there is provided a color filter substrate. The color filter substrate includes: a substrate including a first surface and a second surface opposite to each other; a color filter film disposed on the first surface of the substrate; and a force sensitive film disposed on the second surface of the substrate. Further, the force sensitive film is configured to act as a conductor when no pressure is applied and as a non-conductor when under pressure.

According to a specific implementation, in the color filter substrate provided by an embodiment of the present disclosure, the force sensitive film includes a plurality of force sensitive sub-cells arranged in an array, and two adjacent force sensitive sub-cells are connected by a lead of a preset width.

According to a specific implementation, in the color filter substrate provided by an embodiment of the present disclosure, the color filter substrate is configured to be aligned with an array substrate, wherein the array substrate is provided with a plurality of touch sensors arranged in an array, and an orthographic projection of each force sensitive sub-cell on the array substrate overlaps with a corresponding touch sensor.

According to a specific implementation, the color filter substrate provided by an embodiment of the present disclosure further includes a conductive unit having a first end and a second end. Further, the first end of the conductive unit is connected to the force sensitive film, and the second end of the conductive unit is connected to a ground terminal, for transferring static electricity on the force sensitive film to the ground terminal.

According to a specific implementation, in the color filter substrate provided by an embodiment of the present disclosure, the conductive unit is made of silver paste, and the ground terminal is located on the array substrate. Further, the first end of the conductive unit is coated on the force sensitive film, and the second end of the conductive unit is bridged to the ground terminal on the array substrate.

According to a specific implementation, in the color filter substrate provided by an embodiment of the present disclosure, the force sensitive film is made of doped zinc oxide.

According to another aspect of the present disclosure, there is also provided a display panel. The display panel includes: an array substrate; and the color filter substrate as described in any of the preceding embodiments.

According to yet another aspect of the present disclosure, a method for fabricating a color filter substrate is also provided. Specifically, the fabricating method includes: providing a substrate, the substrate including a first surface and a second surface opposite to each other; forming a color filter film on the first surface of the substrate; and forming a force sensitive film on the second surface. Further, the force sensitive film is configured to act as a conductor when no pressure is applied and as a non-conductor when under pressure.

According to a specific implementation, the method for fabricating a color filter substrate provided by an embodiment of the present disclosure further includes: after forming the force sensitive film on the second surface of the substrate, continuing to form a conductive unit on the second surface of the color filter substrate. Specifically, the conductive unit has a first end and a second end, wherein the first end is connected to the force sensitive film, and the second end of the conductive unit is connected to a ground terminal, for transferring static electricity on the force sensitive film to the ground terminal.

According to a specific implementation, in the method for fabricating a color filter substrate provided by an embodiment of the present disclosure, the color filter substrate is configured to be aligned with an array substrate, and the ground terminal is disposed on the array substrate. In addition, the conductive unit is formed by using silver paste, so that the first end of the conductive unit is coated on the force sensitive film, and the second end of the conductive unit is bridged to the ground terminal on the array substrate.

DETAILED DESCRIPTION OF THE EMBODIMENTS

In order to render objects, features and advantages of the present disclosure to be clearer, the present disclosure will be further described below in detail with reference to the drawings and embodiments.

In the description of the present disclosure, "a plurality of" means two or more than two unless otherwise specified, and the orientation or positional relationship as indicated by the terms such as "above", "below", "left", "right", "inner", "outside" or the like is based on the orientation or positional relationship shown in the drawings. This is merely to facilitate the description of the present disclosure and to simplify it, rather than to indicate or imply that the elements as involved must have a particular orientation or be constructed and operated in a particular orientation. Therefore, all such expressions should not be construed as limiting the present disclosure.

It should be noted that, in the description of the present disclosure, the terms such as "installation", "connect with", and "connect" should be interpreted broadly unless explicitly stated and defined otherwise. For example, it can be a fixed connection, a detachable connection or an integral connection. Of course, it can be a mechanical connection or electrical connection as well. Alternatively, it can be a direct connection or an indirect connection through an intermediary. Those of ordinary skills in the art can understand the specific meanings of the above terms in the present disclosure according to specific circumstances.

Specific implementations of the present disclosure will be described further in detail below with reference to the drawings and embodiments. The following embodiments are only used to illustrate the present disclosure, but not used to limit the scope of the present disclosure.

In general, a color resist layer, a black matrix, and the like are provided on one surface of the color filter substrate, and an indium tin oxides (ITO) conductive layer is provided on the other surface of the color filter substrate. This means that, for example, an ITO conductive layer is provided on the back surface of the color filter substrate for transferring static electricity from the color filter substrate, thereby improving the antistatic capability of the color filter substrate. However, for a TDDI type product, if an ITO conductive layer is provided on the back surface of the color filter substrate, a capacitance will be formed between the ITO conductive layer and a finger because ITO can act as a conductor. This capacitance will seriously interfere with the capacitance of the touch sensor disposed inside the display panel, making it difficult for the capacitance of the touch sensor to change effectively, and resulting in the touch sensor being shielded. In such a case, the touch sensitivity is reduced, and the touch display panel even can't realize the touch function.

However, if no ITO conductive layer is provided on the back surface of the color filter substrate, the surface of the color filter substrate will lack charge transfer channels, resulting in accumulation of static electricity on the surface of the color filter substrate. In such a case, electrical conductivity and antistatic capability for the surface of the display panel will be greatly reduced, making the TDDI type product vulnerable to static electricity.

Figure 1:
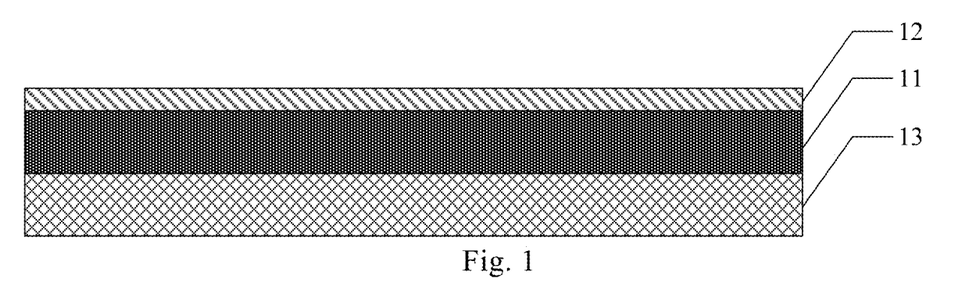
FIG. 1 shows a schematic sectional view of a color filter substrate according to an embodiment of the present disclosure.

In view of above, referring to FIG. 1, a schematic sectional view of a color filter substrate according to an embodiment of the present disclosure is shown. In an embodiment of the present disclosure, a color filter substrate is provided. Specifically, the color filter substrate includes a substrate 11, a force sensitive film 12, and a color filter film 13. The color filter film 13 is disposed on one surface of the substrate 11, and the force sensitive film is disposed on another opposite surface of the substrate 11. Further, the force sensitive film 12 is configured to act as a conductor when no pressure is applied and acts as a non-conductor when under pressure.

In this way, when a touch operation is received on a display panel including the color filter substrate, the pressure introduced by the touch operation changes the conductive characteristics of the force sensitive film 12 at the pressed position, thereby making the portion of the force sensitive film 12 at that position converted from a conductor to a non-conductor. In this case, the shielding effect of the portion of the force sensitive film 12 at that position on the touch sensor unit 21 inside the display panel can be avoided.

When no touch operation is received on the display panel including the color filter substrate, the force sensitive film 12 is a conductor and can be used to release static electricity. For example, static electricity can be distributed throughout the force sensitive film 12 to reduce influences of the static electricity. Alternatively, static electricity is directed into the ground terminal through another conductive silver paste, so that static electricity can be safely released. In this way, the antistatic capability for the surface of the display panel is significantly improved, and the influence of static electricity on the TDDI type product is effectively reduced.

In summary, embodiments of the present disclosure provide a color filter substrate. Specifically, by using the different conductive characteristics of the force sensitive film 12 on the back surface of the color filter substrate when under pressure and with no pressure applied respectively, the influence of static electricity on the TDDI type product can be effectively reduced while still ensuring the touch sensitivity. That is, the force sensitive film 12 is a non-conductor when it is under pressure. Therefore, when a touch operation is performed, the touch sensor unit 21 inside the display panel will not be shielded, thereby ensuring the touch sensitivity. Moreover, the force sensitive film 12 is a conductor when no pressure is applied. Therefore, when no touch operation exists, static electricity can be released through the surface of the color filter substrate on which the force sensitive film 12 is formed. In this way, the antistatic capability for the surface of the display panel is significantly improved, and the risk of burning of the metal layer in the display panel due to static electricity is effectively reduced, thereby improving the quality and competitiveness of the product effectively.

Figure 2:
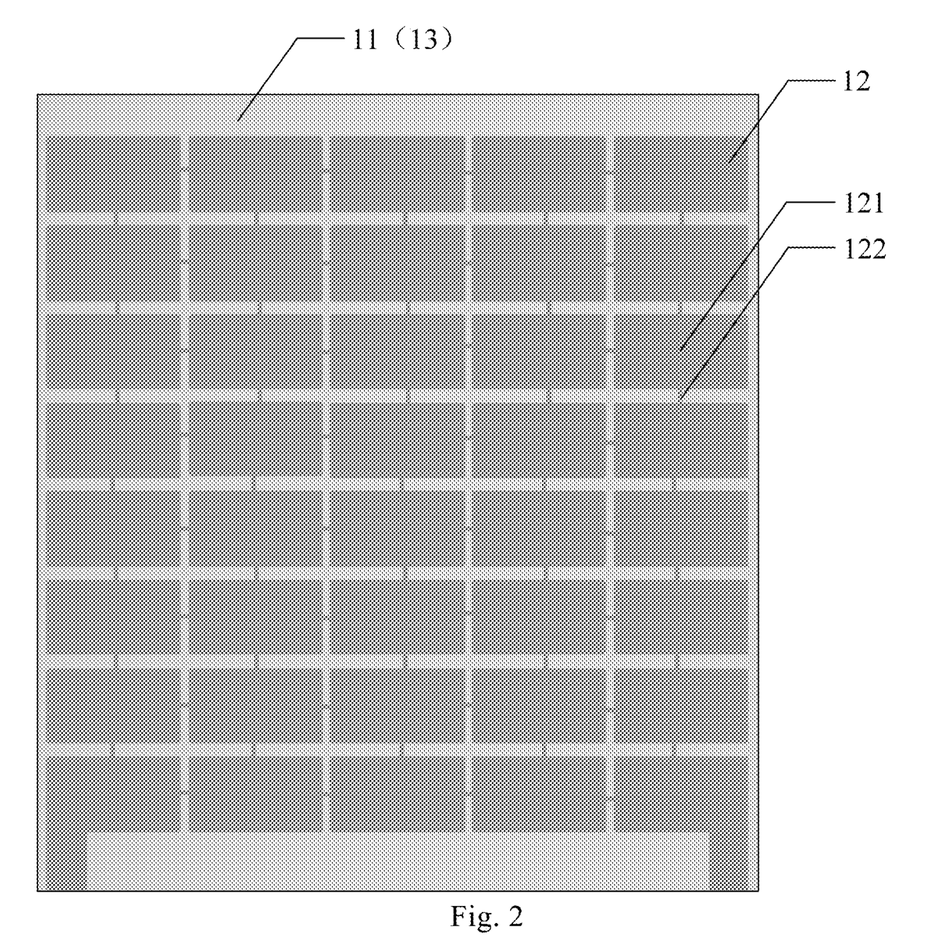
FIG. 2 shows a schematic front view of a color filter substrate according to an embodiment of the present disclosure.

Referring to FIG. 2, a schematic front view of a color filter substrate according to an embodiment of the present disclosure is shown. As can be seen in FIG. 2, in the color filter substrate provided by an embodiment of the present disclosure, the force sensitive film 12 includes a plurality of force sensitive sub-cells 121 arranged in an array, and two adjacent force sensitive sub-cells 121 are connected by a lead 122 of a preset width. The shapes and distributions of various force sensitive sub-cells 121 on the force sensitive film 12 are consistent with the shapes and distributions of the respective touch sensors 21 on the corresponding array substrate. In addition, the lead 122 is set to have a preset width. This means that the width of the lead 122 is neither the wider the better, nor the thinner the better. The wider the lead 122 is, the more convenience they are to transfer static electricity, thus leading to better electrical characteristics. However, a lead 122 with too large width also affects the optical characteristics. In addition, the thinner the lead 122 is, the less likely they are to affect the visual experience, thus leading to better optical characteristics. However, a lead 122 with too small width can also affects the electrical characteristics. Therefore, based on the requirement of the color filter substrate for the optical and electrical characteristics of the force sensitive film 12, the preset width can be determined according to the balance result between the two characteristics.

Specifically, from the optical point of view, different media have different refractive indices. Therefore, a transparent film is generally visible at specific viewing angles such as a full viewing angle. For example, in a TDDI type product, touch sensors 21 for realizing the touch function are made of transparent films, but are still visible at specific viewing angles such as a full viewing angle. Therefore, from the optical point of view, the thinner the lead 122 in the force sensitive film 12 is, the smaller the influence on the display effect is, and the less likely they are to affect the visual experience and thus have better optical characteristics.

From the electrical point of view, the lead 122 represents a channel for releasing charges from various force sensitive sub-cells 121 in the force sensitive film 12, i.e. a channel through which electrostatic charge is transferred. Thus, the wider the lead 122 is, the wider the channel for transferring charge to the outside. As a result, static electricity can be transferred to the outside more effectively, and static electricity is less likely to be accumulated on the surface of the color filter substrate. In such a case, electrical conductivity and antistatic capability for the surface of the display panel can be effectively improved. Moreover, the wider the lead 122 is, the stronger its antistatic capability is, and thus the risk of being burned by static electricity can be reduced.

In practical applications, the lead 122 connecting two force sensitive sub-cells 121 can be formed by at least one lead. For example, two leads 122 connecting two force sensitive sub-cells 121 can be provided. In such a case, when one of the leads 122 is electrostatically burned, the other one of the leads 122 can continue to be used to transfer charges to the outside. As a result, the working stability of the force sensitive film 12 can be improved.

Specifically, in the TDDI type product, the touch sensor 21 is visible at specific viewing angles such as a full viewing angle. Therefore, the shapes and distributions of various force sensitive sub-cells 121 in the force sensitive film 12 can be disposed to be consistent with the shapes and distributions of respective touch sensors 21 on the corresponding array substrate. In this way, even at a specific viewing angle such as a full viewing angle, the force sensitive film 12 is not easily observed, thereby reducing the influence of the force sensitive film 12 on the display effect effectively. Moreover, since the respective force sensitive sub-cells 121 form a mesh structure by connecting lines, the electrostatic protection effect at the untouched position can be achieved more accurately. That is, when the touched position in the force sensitive film 12 becomes an insulator, the untouched position in the force sensitive film 12 still exhibits an electrostatic shielding effect. Therefore, it is possible to achieve the greatest degree of electrostatic protection.

Figure 3:
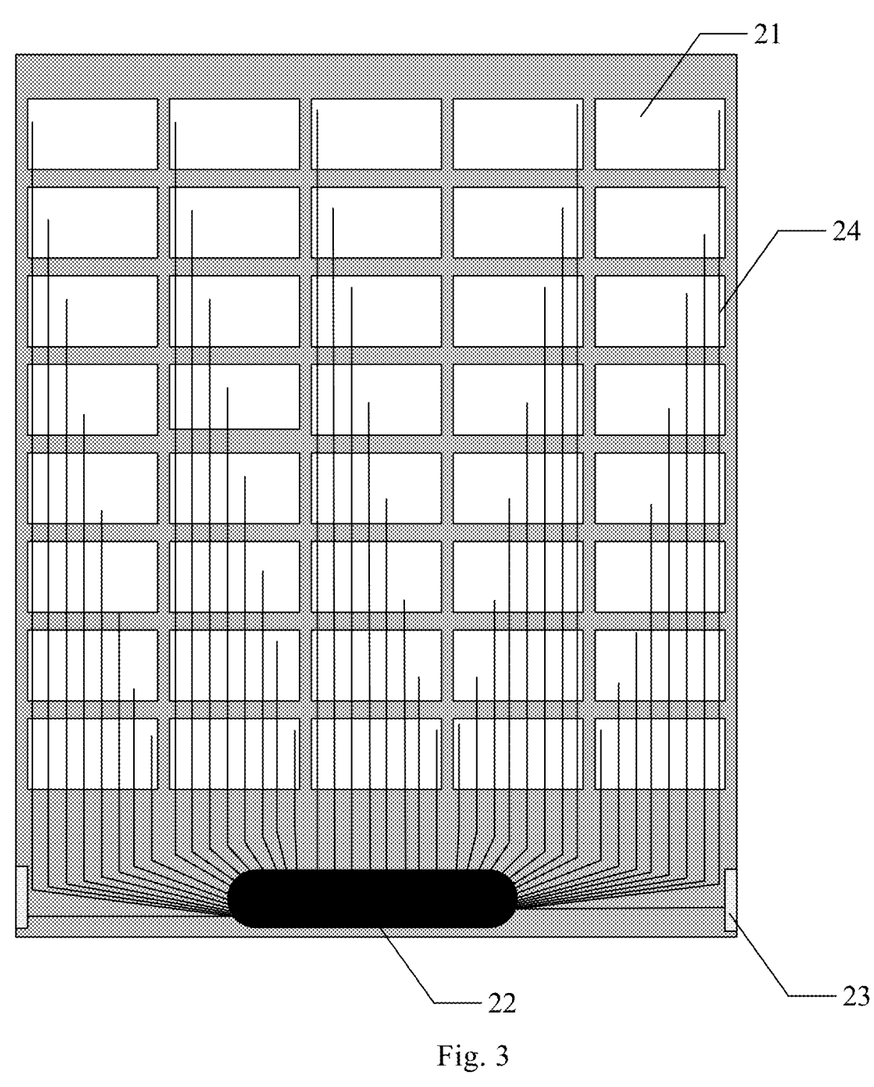
FIG. 3 shows a schematic front view of an array substrate for aligning with a color filter substrate according to an embodiment of the present disclosure.

In practical applications, the color filter substrate can also be provided with a conductive unit 30. As an example, the conductive unit 30 is located on the surface of the color filter substrate on which the force sensitive film 12 is formed, wherein one end of the conductive unit 30 is connected to the force sensitive film 12, and the other end of the conductive unit 30 is connected to the ground terminal 23. Specifically, the conductive unit 30 can be made of silver paste, and the ground terminal 23 is located on the array substrate. One end of the conductive unit 30 made of silver paste is coated on the force sensitive film 12, and the other end of the conductive unit 30 is bridged to the ground terminal 23 on the array substrate, for transferring static electricity on the force sensitive film 12 to the ground terminal 23 of the array substrate. In an optional instance, the area where the conductive unit 30 overlaps with the force sensitive film 12 is located at one or both sides of the projection of the data pad (DP) of the array substrate on the color filter substrate. Therefore, static electricity on the surface of the color filter substrate can be transferred to the corner position of the force sensitive film 12 through the respective force sensitive sub-cells 121 in the force sensitive film 12 and the leads 122 connecting the respective force sensitive sub-cells 121. After that, static electricity is transferred to the ground terminal 23 of the array substrate through the conductive unit 30, so that static electricity on the surface of the color filter substrate can be released in time.

As an example, the force sensitive film 12 can be made of doped zinc oxide. Specifically, during the preparation of the doped zinc oxide, the type of doping ions and the proportion of doping in the zinc oxide can be used to adjust electrical conductivity of the force sensitive film 12. In practical applications, the type of doping ions and the proportion of doping can also be used to adjust the sensitivity of the force sensitive film 12 in recognizing touch operations. For example, tungsten ions and/or titanium ions can be doped in zinc oxide, and the lattice structure of zinc oxide can be influenced by adjusting the proportion of the dopant ions. Thus, the force sensitive film 12 having different electrical conductivity can be obtained.

In summary, embodiments of the present disclosure provide a color filter substrate. In the color filter substrate, the shapes and distributions of various force sensitive sub-cells 121 in the force sensitive film 12 are disposed to be consistent with the shapes and distributions of the respective touch sensors 21 on the corresponding array substrate. In this way, the influence of the force sensitive film 12 on the display effect can be effectively reduced. In addition, through the conductive unit 30 coated on the color filter substrate, static electricity can be also released in time when touch operation exists, thereby improving the antistatic capability of the color filter substrate. In addition, the optical characteristics and electrical characteristics of the force sensitive film 12 can also be effectively balanced by the lead 122 with a preset width and connecting the force sensitive sub-cells 121.

Figure 4:
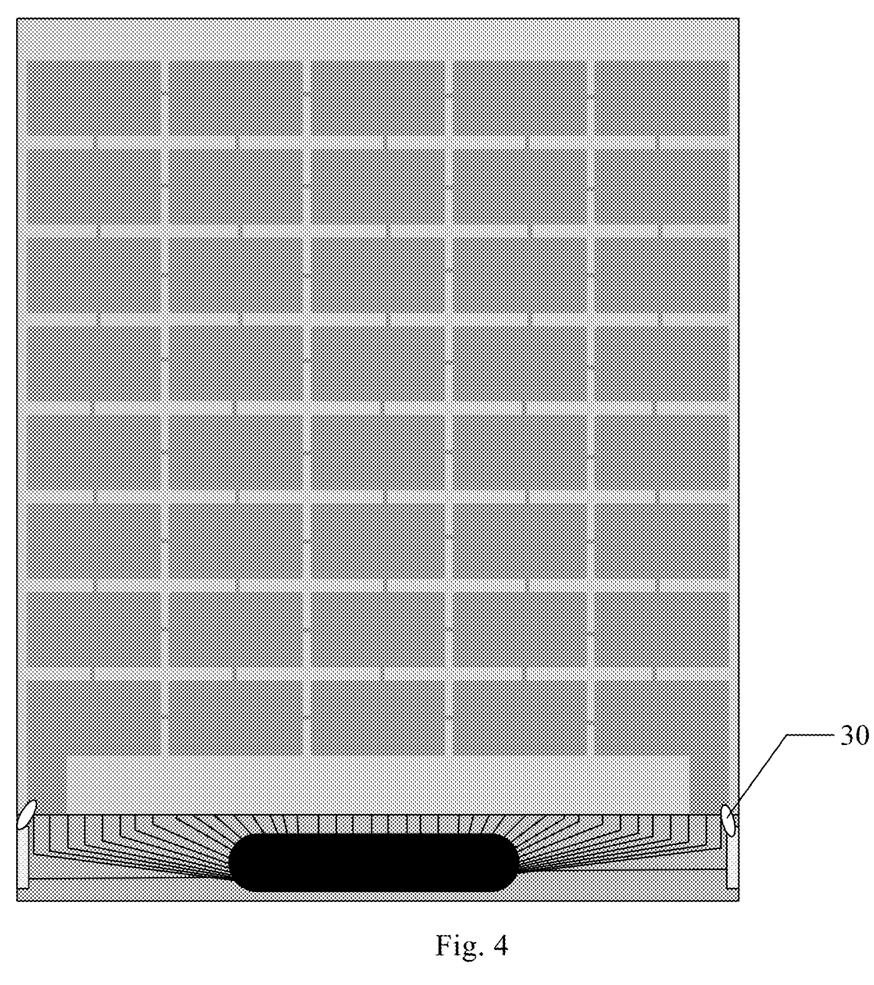
FIG. 4 shows a schematic front view of a display panel according to an embodiment of the present disclosure.

Referring to FIG. 3, a schematic front view of an array substrate for aligning with a color filter substrate according to an embodiment of the present disclosure is shown. Referring to FIG. 4, a schematic front view of a display panel according to an embodiment of the present disclosure is shown. As can be seen in FIG. 4, the display panel can include an array substrate and the color filter substrate as mentioned above.

Specifically, the array substrate includes a plurality of touch sensors 21, a touch IC 22, a data pad, two ground terminals 23, and touch lines 24. Specifically, the data pad is located at one side of the array substrate and is used for loading data signals. The touch IC 22 is located at the projection position of the data pad, and the two ground terminals 23 are located at both sides of the data pad, that is, on both sides of the touch IC 22. The touch lines 24 are used to connect the touch sensors 21 and the touch IC 22.

In the display panel, there are areas on the array substrate that are not covered by the color filter substrate, and the ground terminals 23 are located in these areas. Since the silver paste has fluidity, the silver paste can be made into the conductive unit 30. That is, the silver paste can be bridged from the color filter substrate to the array substrate due to its fluidity, thereby forming the conductive unit 30. In addition, one end of the silver paste can be covered on the corner of the force sensitive film 12, and the other end of the silver paste can be bridged to the ground terminal(s) 23 of the array substrate, so as to transfer static electricity on the force sensitive film 12 to the ground terminal(s) 23 of the array substrate.

In practical applications, a flexible circuit board can also be attached on the force sensitive film 12 in place of the silver paste conductive unit 30. Specifically, one end of the flexible circuit board can be covered on the corner of the force sensitive film 12, and the other end of the flexible circuit board can be bridged to the ground terminal(s) 23 of the array substrate, so as to transfer static electricity on the force sensitive film 12 to the ground terminal(s) 23 of the array substrate.

In summary, embodiments of the present disclosure provide a display panel. In the display panel, a color filter substrate including a force sensitive film 12 is introduced. Therefore, when a touch operation is performed, the touch sensor unit 21 inside the display panel is not shielded, thereby ensuring the touch sensitivity. In addition, when no a touch operation occurs, static electricity can be released. Specifically, static electricity can be transferred to the ground terminal(s) 23 of the array substrate in time by the conductive unit 30 covering the corner position of the force sensitive film 12. In this way, under the premise that the touch sensor 21 is not shielded, the influence of static electricity on the TDDI type product is also effectively reduced, thereby significantly improving the antistatic capability of the entire display panel. Further, it also helps to effectively reduce the risk of burning of metal layers inside the display panel due to static electricity.

Figure 5:
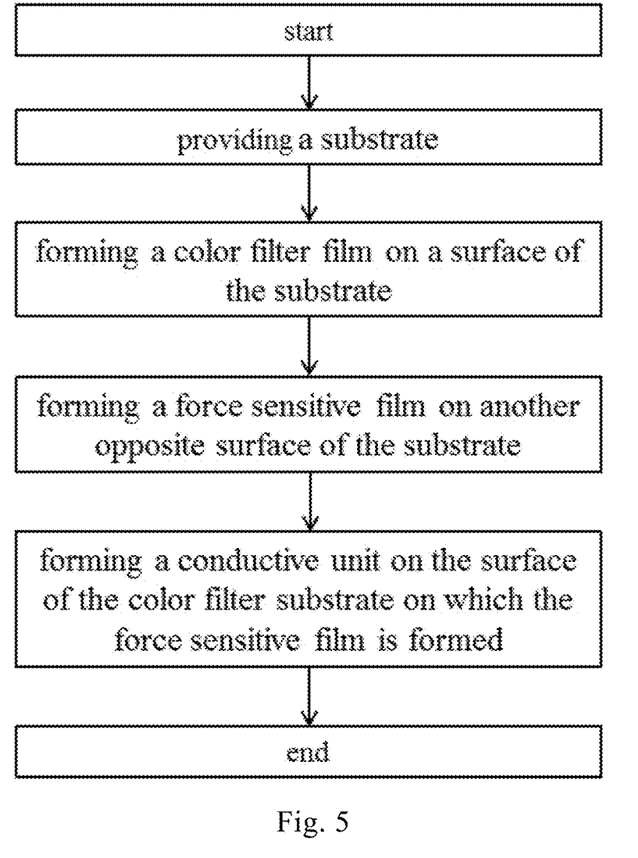
FIG. 5 shows a flow chart of a method for fabricating a color filter substrate according to an embodiment of the present disclosure.

Embodiments of the present disclosure also provide a method for fabricating a color filter substrate. The fabrication method can be used for fabricating the color filter substrate as mentioned above. Referring to FIG. 5, a flow chart of a method for fabricating a color filter substrate according to an embodiment of the present disclosure is shown.

In step 501, a substrate is provided.

Specifically, the substrate can include a glass substrate.

In step 502, a color filter film is formed on one surface of the substrate.

Specifically, patterned film structures such as a black matrix, a color resist layer, a flat layer, and a photo spacer can be sequentially formed on one surface of the substrate such that the color filter film is formed.

In step 503, a force sensitive film is formed on the other opposite surface of the substrate.

Further, the force sensitive film 12 can be configured to act as a conductor when no pressure is applied and as a non-conductor when under pressure.

Specifically, the force sensitive film 12 can be made of doped zinc oxide. Alternatively, other similar materials can also be used to form the force sensitive film 12. In such a case, when a touch operation is received on the display panel including the color filter substrate, the conductive characteristics of the force sensitive film 12 at the pressed position can be changed due to the pressure introduced by the touch operation, thereby making the portion of the force sensitive film 12 at that position converted from a conductor to a non-conductor. In this way, the shielding effect of the portion of the force sensitive film 12 at that position on the touch sensor unit 21 inside the display panel can be avoided. When no touch operation is received, the force sensitive film 12 is a conductor and can be used to release static electricity. For example, static electricity can be transferred from a position on the surface of the color filter substrate to edges of the color filter substrate. After that, static electricity can also be completely released by the wire connected to the edges of the force sensitive film 12. In this way, the antistatic capability for the surface of the display panel is significantly improved, and the influence of static electricity on the TDDI type product is effectively reduced.

In practical applications, the force sensitive film 12 can be patterned using a mask corresponding to the shape of the touch sensor on the array substrate, thereby forming the patterned force sensitive film 12. Further, the patterned force sensitive film 12 can include a plurality of force sensitive sub-cells 121, and a lead 122 for connecting adjacent force sensitive sub-cells 121. In addition, the shapes and distributions of various force sensitive sub-cells 121 on the force sensitive film 12 can be consistent with the shapes and the distributions of the respective touch sensors 21 on the array substrate.

In step 504, a conductive unit is formed continuously on the surface of the color filter substrate on which the force sensitive film is formed.

Further, one end of the conductive unit 30 is connected to the force sensitive film 12 and the other end is connected to the ground terminal(s) 23.

Specifically, at positions of the array substrate near the data pad, there are areas that are not covered by the color filter substrate. When the ground terminals 23 are located on the array substrate aligned with the color filter substrate, and the conductive unit 30 is made of silver paste, one end of the silver paste can be coated on the force sensitive film 12 and the other end of the silver paste can be bridged to the ground terminal(s) 23 on the array substrate. In this way, static electricity on the force sensitive film 12 is transferred to the ground terminal(s) 23 on the array substrate. That is, the silver paste can achieve a bridge connection between the color filter substrate and the array substrate due to its fluidity.

In practical applications, before forming the conductive unit 30 on the force sensitive film 12, a polarizer can also be attached on the force sensitive film 12, so as to avoid the bad attachment of the polarizer due to the offset in the coating position of the conductive unit 30.

Embodiments of the method for fabricating the color filter substrate correspond to any one of the color filter substrates as described above. Therefore, the same technical problem can be solved, and the same technical effect can be achieved, which will not be described here.

Each embodiment in the above description is described in a progressive manner. Specifically, what each embodiment emphasizes is a difference of one embodiment from the others, and for the same or similar portions between various embodiments, they can refer to each other.

The color filter substrate, the fabrication method thereof and the display panel as provided in embodiments of present disclosure have been introduced in detail. Principles and implementations of the present disclosure are expounded herein by referring to specific examples. The explanations of these embodiments are only used for helping to understand the method of the present disclosure and the core concept thereof. Meanwhile, those of ordinary skills in the art can modify the specific implementations and application scopes according to the idea of the present disclosure. In conclusion, the content of the description should not be construed as limiting the present disclosure.

The invention claimed is:

1. A color filter substrate, comprising:
a substrate, comprising a first surface and a second surface opposite to each other;
a color filter film, disposed on the first surface of the substrate; and
a force sensitive film, disposed on the second surface of the substrate, wherein
the force sensitive film is electrically conductive with a zero pressure applied thereon, but becomes electrically isolated at least at a portion to which a non-zero pressure is applied.

2. The color filter substrate according to claim 1, wherein the force sensitive film comprises a plurality of force sensitive sub-cells arranged in an array, and two adjacent force sensitive sub-cells are connected by a lead of a preset width.

3. The color filter substrate according to claim 2, wherein the color filter substrate is configured to be aligned with an array substrate, the array substrate is provided with a plurality of touch sensors arranged in an array, wherein
an orthographic projection of each force sensitive sub-cell on the array substrate overlaps with a corresponding touch sensor.

4. The color filter substrate according to claim 3, further comprising: a conductive unit having a first end and a second end, wherein
the first end of the conductive unit is connected to the force sensitive film, and the second end of the conductive unit is connected to a ground terminal, for transferring static electricity on the force sensitive film to the ground terminal.

5. The color filter substrate according to claim 4, wherein
the conductive unit is made of silver paste,
the ground terminal is located on the array substrate,
the first end of the conductive unit is coated on the force sensitive film, and
the second end of the conductive unit is bridged to the ground terminal on the array substrate.

6. The color filter substrate according to claim 1, wherein the force sensitive film is made of doped zinc oxide.

7. A display panel, comprising:
an array substrate; and
the color filter substrate according to claim 1.

8. The display panel according to claim 7, wherein
the force sensitive film comprises a plurality of force sensitive sub-cells arranged in an array, and two adjacent force sensitive sub-cells are connected by a lead of a preset width.

9. The display panel according to claim 8, wherein
the color filter substrate is configured to be aligned with an array substrate, the array substrate is provided with a plurality of touch sensors arranged in an array, wherein
an orthographic projection of each force sensitive sub-cell on the array substrate overlaps with a corresponding touch sensor.

10. The display panel according to claim 9, further comprising: a conductive unit having a first end and a second end, wherein
the first end of the conductive unit is connected to the force sensitive film, and the second end of the conductive unit is connected to a ground terminal, for transferring static electricity on the force sensitive film to the ground terminal.

11. The display panel according to claim 10, wherein
the conductive unit is made of silver paste,
the ground terminal is located on the array substrate,
the first end of the conductive unit is coated on the force sensitive film, and
the second end of the conductive unit is bridged to the ground terminal on the array substrate.

12. The display panel according to claim 7, wherein
the force sensitive film is made of doped zinc oxide.

13. A method for fabricating a color filter substrate, comprising:
providing a substrate, wherein the substrate comprises a first surface and a second surface opposite to each other;
forming a color filter film on the first surface of the substrate; and
forming a force sensitive film on the second surface of the substrate,
wherein the force sensitive film is electrically conductive with a zero pressure applied thereon, but becomes electrically isolated at least at a portion to which a non-zero pressure is applied.

14. The method according to claim 13, further comprising:
after forming the force sensitive film on the second surface of the substrate, continuing to form a conductive unit on the second surface of the color filter substrate, wherein
the conductive unit has a first end and a second end, the first end of the conductive unit is connected to the force sensitive film, and the second end of the conductive unit is connected to a ground terminal, for transferring static electricity on the force sensitive film to the ground terminal.

15. The fabrication method according to claim 14, wherein
the color filter substrate is configured to be aligned with an array substrate,
the ground terminal is disposed on the array substrate, and
the conductive unit is formed by using silver paste, so that the first end of the conductive unit is coated on the force sensitive film, and the second end of the conductive unit is bridged to the ground terminal on the array substrate.

* * * * *